United States Patent
Mustafi

(10) Patent No.: US 11,720,589 B2
(45) Date of Patent: *Aug. 8, 2023

(54) SYSTEM AND METHOD FOR TRANSFORMATION OF UNSTRUCTURED DOCUMENT TABLES INTO STRUCTURED RELATIONAL DATA TABLES

(71) Applicant: salesforce.com, inc., San Francisco, CA (US)

(72) Inventor: Joy Mustafi, Telangana (IN)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/398,755

(22) Filed: Aug. 10, 2021

(65) Prior Publication Data

US 2021/0365450 A1 Nov. 25, 2021

Related U.S. Application Data

(63) Continuation of application No. 16/536,165, filed on Aug. 8, 2019, now Pat. No. 11,106,668.

(51) Int. Cl.
*G06F 17/30* (2006.01)
*G06F 16/25* (2019.01)
*G06F 16/2453* (2019.01)
*G06F 16/28* (2019.01)

(52) U.S. Cl.
CPC ...... *G06F 16/258* (2019.01); *G06F 16/24534* (2019.01); *G06F 16/254* (2019.01); *G06F 16/282* (2019.01); *G06F 16/284* (2019.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 7,730,478 | B2 | 6/2010 | Weissman |
| 7,779,039 | B2 | 8/2010 | Weissman et al. |
| 8,966,439 | B2 | 2/2015 | Wolfram |
| 9,330,084 | B1 | 5/2016 | Kadambi et al. |

(Continued)

FOREIGN PATENT DOCUMENTS

WO 2013013173 A2 1/2013

OTHER PUBLICATIONS

IBM Watson Analytics, retrieved from the internet, http://www.ibm.com/analytics/watson-analytics/ (1 page).

(Continued)

*Primary Examiner* — Hung D Le
(74) *Attorney, Agent, or Firm* — Haynes and Boone, LLP

(57) ABSTRACT

Embodiments described herein transforms a complex and usually unstructured table to a relational table based on the header pattern. Specifically, the original complex table is expanded into a single dimensional relational database format, in which each cell corresponds to one or more corresponding categories or subcategories from the original header. The transformed one-dimensional relational table is then populated with the corresponding cell values from the original table. In this way, data from the original complex and unstructured data table can be stored at a relational database.

20 Claims, 11 Drawing Sheets

(56) References Cited

U.S. PATENT DOCUMENTS

| | | |
|---|---|---|
| 9,430,557 B2 | 8/2016 | Bhat et al. |
| 9,430,558 B2 | 8/2016 | Bhat et al. |
| 9,460,075 B2 | 10/2016 | Mungi et al. |
| 9,495,355 B2 | 11/2016 | Mungi et al. |
| 9,514,185 B2 | 12/2016 | Mungi et al. |
| 9,535,894 B2 | 1/2017 | Carrier et al. |
| 9,613,091 B2 | 4/2017 | Mungi et al. |
| 9,684,876 B2 | 6/2017 | Agarwalla et al. |
| 9,916,303 B2 | 3/2018 | Mungi et al. |
| 10,102,276 B2 | 10/2018 | Joshi et al. |
| 10,133,732 B2 | 11/2018 | Mungi et al. |
| 10,275,712 B2 | 4/2019 | Bhat et al. |
| 10,275,713 B2 | 4/2019 | Bhat et al. |
| 10,318,641 B2 | 6/2019 | Mustafi et al. |
| 10,417,581 B2 | 9/2019 | Agarwalla et al. |
| 10,426,551 B2 | 10/2019 | Gupta et al. |
| 10,489,229 B2 | 11/2019 | Mustafi et al. |
| 10,521,513 B2 | 12/2019 | Mustafi et al. |
| 2008/0071796 A1* | 3/2008 | Ghuneim ............ G06F 16/9038 |
| 2008/0208830 A1* | 8/2008 | Lauckhart ............ G06F 16/332 |
| 2008/0263403 A1 | 10/2008 | Soklakov |
| 2010/0281350 A1 | 11/2010 | Xie et al. |
| 2013/0179772 A1* | 7/2013 | Nakamura ............ G06F 40/154 |
| | | 715/234 |
| 2013/0304688 A1 | 11/2013 | Osogami et al. |
| 2014/0250045 A1 | 9/2014 | Bounouane et al. |
| 2015/0331846 A1 | 11/2015 | Guggilla et al. |
| 2016/0292153 A1 | 10/2016 | Agarwalla et al. |
| 2016/0371238 A1* | 12/2016 | Heaven ................ G06F 40/186 |
| 2017/0039192 A1 | 2/2017 | Mustafi et al. |
| 2017/0039193 A1 | 2/2017 | Mustafi et al. |
| 2017/0052985 A1 | 2/2017 | Guggilla et al. |
| 2017/0052988 A1 | 2/2017 | Guggilla et al. |
| 2018/0160894 A1 | 6/2018 | Gupta et al. |
| 2019/0362265 A1 | 11/2019 | Agarwalla et al. |

OTHER PUBLICATIONS

MS Excel: "Convert numbers into words", retrieved from the internet, https://support.microsoft.com/en-us/kb/213360 (4 pages).

MS Azure Machine Learning,, retrieved from the internet, http://azure.microsoft.com/en-in/services/machine-learning/ (2 pages).

K. Morton et al., "A Novel Framework for Math Word Problem Solving," International Journal of Information and Education Technology, vol. 3, No. 1, Feb. 2013 (6 pages).

* cited by examiner

Transformed 1-D Table 350

| CANDIDATES_EXAMINATION | | | | |
|---|---|---|---|---|
| YEAR | STATE | APP | QUAL | SEL |
| 1997 | Delhi | 8000 | 850 | 94 |
| 1998 | Delhi | 4800 | 500 | 48 |
| 1999 | Delhi | 7500 | 640 | 82 |
| 2000 | Delhi | 9500 | 850 | 90 |
| 2001 | Delhi | 9000 | 800 | 70 |
| 1997 | H.P. | 7800 | 810 | 82 |
| 1998 | H.P. | 7500 | 800 | 65 |
| 1999 | H.P. | 7400 | 560 | 70 |
| 2000 | H.P. | 8800 | 920 | 86 |
| 2001 | H.P. | 7200 | 850 | 75 |
| 1997 | U.P. | 7500 | 720 | 78 |
| 1998 | U.P. | 5600 | 620 | 85 |
| 1999 | U.P. | 4800 | 400 | 48 |
| 2000 | U.P. | 7000 | 650 | 70 |
| 2001 | U.P. | 8500 | 950 | 80 |
| 1997 | Punjab | 8200 | 680 | 85 |
| 1998 | Punjab | 6800 | 600 | 70 |
| 1999 | Punjab | 6500 | 525 | 65 |
| 2000 | Punjab | 7800 | 720 | 84 |
| 2001 | Punjab | 5700 | 485 | 60 |
| 1997 | Haryana | 6400 | 700 | 75 |
| 1998 | Haryana | 7100 | 650 | 75 |
| 1999 | Haryana | 5200 | 350 | 55 |
| 2000 | Haryana | 6400 | 540 | 60 |
| 2001 | Haryana | 4500 | 600 | 75 |

*FIG. 5B*

SYSTEM AND METHOD FOR TRANSFORMATION OF UNSTRUCTURED DOCUMENT TABLES INTO STRUCTURED RELATIONAL DATA TABLES

CROSS REFERENCES

This application is a continuation of and claims priority under 35 U.S.C. 120 to co-pending and commonly owned U.S. application Ser. No. 16/536,165 (allowed), filed Aug. 8, 2019, which is related to co-pending and commonly-owned U.S. application Ser. No. 16/536,172, filed on Aug. 8, 2019, both of which are hereby expressly incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure generally relates to learning the contents of a document and more specifically to systems and methods for transformation of unstructured document tables into structured relational data tables.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data tables in a textual document (e.g., PDF, PPT, DOC) can often be unstructured or semi-structured, lacking the proper form or supporting information to allow them to be readily stored at a relational database. Such data tables often need to be pre-processed, e.g., by manually reorganizing data rows, columns, or cells of data values into a proper relational database format. For example, a complex table showing mobile subscribers per region may have a header category row with entries "CA," "NY," etc. (but not identifying these as "regions"), and each header category in the first row is broken into multiple header categories with entries "AT&T," "T Mobile," etc. (but not identifying these as "carriers"), and then under the sub-category "AT&T," there can be further subcategories with entries "Motorola," "Apple," "Samsung," etc. (but not identifying these as "types of devices"). Such unstructured complex table including layers of undefined header entries cannot be stored in a relational database directly, because it is unclear what categories each cell value corresponds to.

BRIEF DESCRIPTION OF THE DRAWINGS

FIGS. 5A-5B is a simplified diagram illustrating an operation on an unstructured table by the table conversion module shown in FIG. 3, according to embodiments described herein.

Figure 1:
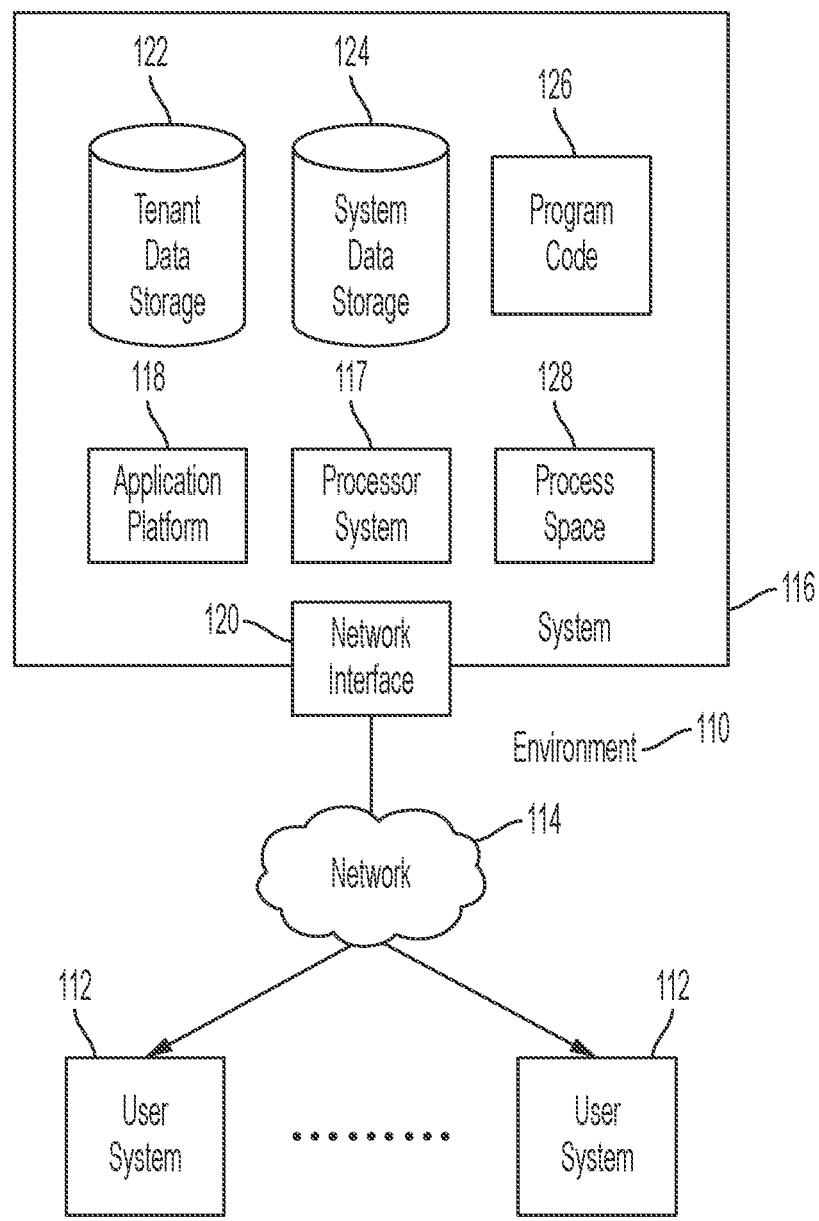
FIG. 1 illustrates a block diagram of an example environment wherein systems and methods for transforming an unstructured table to a one-dimensional table may be provided and used according to some embodiments.

In the figures, elements having the same designations have the same or similar functions.

DETAILED DESCRIPTION

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As used herein, the term "network" may include any hardware or software-based framework that includes any artificial intelligence network or system, neural network or system and/or any training or learning models implemented thereon or therewith.

As used herein, the term "module" may include hardware or software-based framework that performs one or more functions. In some embodiments, the module may be implemented on one or more neural networks.

Overview

In view of the need for transforming unstructured data tables into a relational database structure, embodiments described herein provide a mechanism that automatically analyzes and extracts data tables and tabular information from a textual document via text and pattern recognition. Specifically, a complex and usually unstructured table (e.g., from a non-editable document such as a PDF file, with multiple header and sub-header categories, etc.) is "de-normalized" based on the header pattern. The "de-normalization" process expands the original complex table into a single dimensional relational database format, in which each cell corresponds to one or more corresponding categories or subcategories from the original header. The transformed one-dimensional relational table is then populated with the corresponding cell values from the original table. In this way, data from the original complex and unstructured data table can be stored at a relational database.

Example Environment

The system and methods of the present disclosure can include, incorporate, or operate in conjunction with or in the environment of a database, which in some embodiments can implemented as a multi-tenant, cloud-based architecture. Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost-effective sharing of similar application features between multiple sets of users. In some embodiments, the multi-tenant architecture may provide the data table transformation from an unstructured table to a one-dimensional relational table, as discussed herein.

FIG. 1 illustrates a block diagram of an example environment 110 according to some embodiments. Environment 110 may include user systems 112, network 114, system 116, processor system 117, application platform 118, network interface 120, tenant data storage 122, system data storage 124, program code 126, and process space 128 for executing database system processes and tenant-specific processes, such as running applications as part of an application hosting service. In other embodiments, environment 110 may not have all of the components listed and/or may have other elements instead of, or in addition to, those listed above.

In some embodiments, the environment 110 is an environment in which an on-demand database service exists. A user system 112 may be any machine or system that is used by a user to access a database user system. For example, any of user systems 112 can be a handheld computing device, a mobile phone, a laptop computer, a notepad computer, a work station, and/or a network of computing devices. As illustrated in FIG. 1 (and in more detail in FIG. 2) user systems 112 might interact via a network 114 with an on-demand database service, which is system 116.

An on-demand database service, such as that which can be implemented using the system 116, is a service that is made available to users outside of the enterprise(s) that own, maintain or provide access to the system 116. In some implementations, the on-demand database service may include operations on a relational database. As described above, such users do not need to necessarily be concerned with building and/or maintaining the system 116. Instead, resources provided by the system 116 may be available for such users' use when the users need services provided by the system 116—e.g., on the demand of the users. Some on-demand database services may store information from one or more tenants stored into tables of a common database image to form a multi-tenant database system (MTS). Accordingly, the "on-demand database service 116" and the "system 116" will be used interchangeably herein. The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image may include one or more database objects. A relational data base management system (RDBMS) or the equivalent may execute storage and retrieval of information against the data base object(s).

The application platform 118 may be a framework that allows the applications of system 116 to run, such as the hardware and/or software infrastructure, e.g., the operating system. In an embodiment, on-demand database service 116 may include an application platform 118 that enables creating, managing, and executing one or more applications developed by the provider of the on-demand database service, users accessing the on-demand database service via user systems 112, or third-party application developers accessing the on-demand database service via user systems 112.

The users of user systems 112 may differ in their respective capacities, and the capacity of a particular user system 112 might be entirely determined by permissions (permission levels) for the current user. For example, where a salesperson is using a particular user system 112 to interact with system 116, that user system has the capacities allotted to that salesperson. However, while an administrator is using that user system 112 to interact with system 116, that user system 112 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 114 is any network or combination of networks of devices that communicate with one another. For example, the network 114 can be any one or any combination of a local area network (LAN), wide area network (WAN), telephone network, wireless network, point-to-point network, star network, token ring network, hub network, or other appropriate configuration. As the most common type of computer network in current use is a transfer control protocol and Internet protocol (TCP/IP) network, such as the global inter network of networks often referred to as the "Internet" with a capital "I" that network will be used in many of the examples herein. However, it should be understood that the networks that the present embodiments might use are not so limited, although TCP/IP is a frequently implemented protocol.

The user systems 112 might communicate with system 116 using TCP/IP and, at a higher network level, use other common Internet protocols to communicate. Such as hypertext transfer protocol (HTTP), file transfer protocol (FTP), Andrew file system (AFS), wireless application protocol (WAP), etc. In an example where HTTP is used, user system 112 might include an HTTP client commonly referred to as a "browser" for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least for the users that are accessing that server, each of the plurality of servers has access to the MTS data; however, other alternative configurations may be used instead.

In some embodiments, the system 116, shown in FIG. 1, implements a web-based customer relationship management (CRM) system. For example, in one embodiment, system 116 includes application servers configured to implement and execute CRM software applications as well as provide related data, code, forms, webpages and other information to and from user systems 112 and to store to, and retrieve from, a database system related data, objects, and web page content. With a multi-tenant system, data for multiple tenants may be stored in the same physical database object. However, tenant data typically is arranged so that data of one tenant is kept logically separate from that of other tenants so that one tenant does not have access to another tenant's data, unless such data is expressly shared. In certain embodiments, the system 116 implements applications other than, or in addition to, a CRM application. For example, system 16 may provide tenant access to multiple hosted (standard and custom) applications, including a CRM application. User (or third-party developer) applications, which may or may not include CRM, may be supported by the application platform 118, which manages creation, storage of the applications into one or more database objects, and executing of the applications in a virtual machine in the process space of the system 116.

One arrangement for elements of the system 116 is shown in FIG. 1, including the network interface 120, the application platform 118, the tenant data storage 122 for tenant data 123, the system data storage 124 for system data 125 accessible to system 116 and possibly multiple tenants, the program code 126 for implementing various functions of the system 116, and the process space 128 for executing MTS system processes and tenant-specific processes, such as running applications as part of an application hosting service. Additional processes that may execute on system 116 include database indexing processes.

Several elements in the system shown in FIG. 1 include conventional, well-known elements that are explained only briefly here. For example, each of the user systems 112 could include a desktop personal computer, workstation, laptop, notepad computer, PDA, cell phone, or any wireless access protocol (WAP) enabled device or any other computing device capable of interfacing directly or indirectly to the Internet or other network connection. Each of the user systems 112 typically runs an HTTP client, e.g., a browsing program, such as Microsoft's Internet Explorer browser, Netscape's Navigator browser, Opera's browser, or a WAP-enabled browser in the case of a cell phone, notepad computer, PDA or other wireless device, or the like, allowing a user (e.g., subscriber of the multi-tenant database system) of the user systems 112 to access, process, and view information, pages, and applications available to it from the system 116 over the network 114. Each of the user systems 112 also typically includes one or more user interface devices, such as a keyboard, a mouse, trackball, touch pad, touch screen, pen or the like, for interacting with a graphical user interface (GUI) provided by the browser on a display (e.g., a monitor screen, liquid crystal display (LCD) monitor, light emitting diode (LED) monitor, organic light emitting diode (OLED) monitor, etc.) in conjunction with pages, forms, applications, and other information provided by the system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as the processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 116 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a read only memory (ROM) or random-access memory (RAM), or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory integrated circuits (ICs)), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, virtual private network (VPN), LAN, etc.) using any communication medium and protocols (e.g., TCP/IP, HTTP, HTTPS, Ethernet, etc.) as are well known. It will also be appreciated that computer code for implementing embodiments of the present disclosure can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun MicroSystems, Inc.).

According to one embodiment, the system 116 is configured to provide webpages, forms, applications, data and media content to the user (client) systems 112 to support the access by the user systems 112 as tenants of the system 116. As such, the system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., object-oriented data base management system (OODBMS) or relational database management system (RDBMS)) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
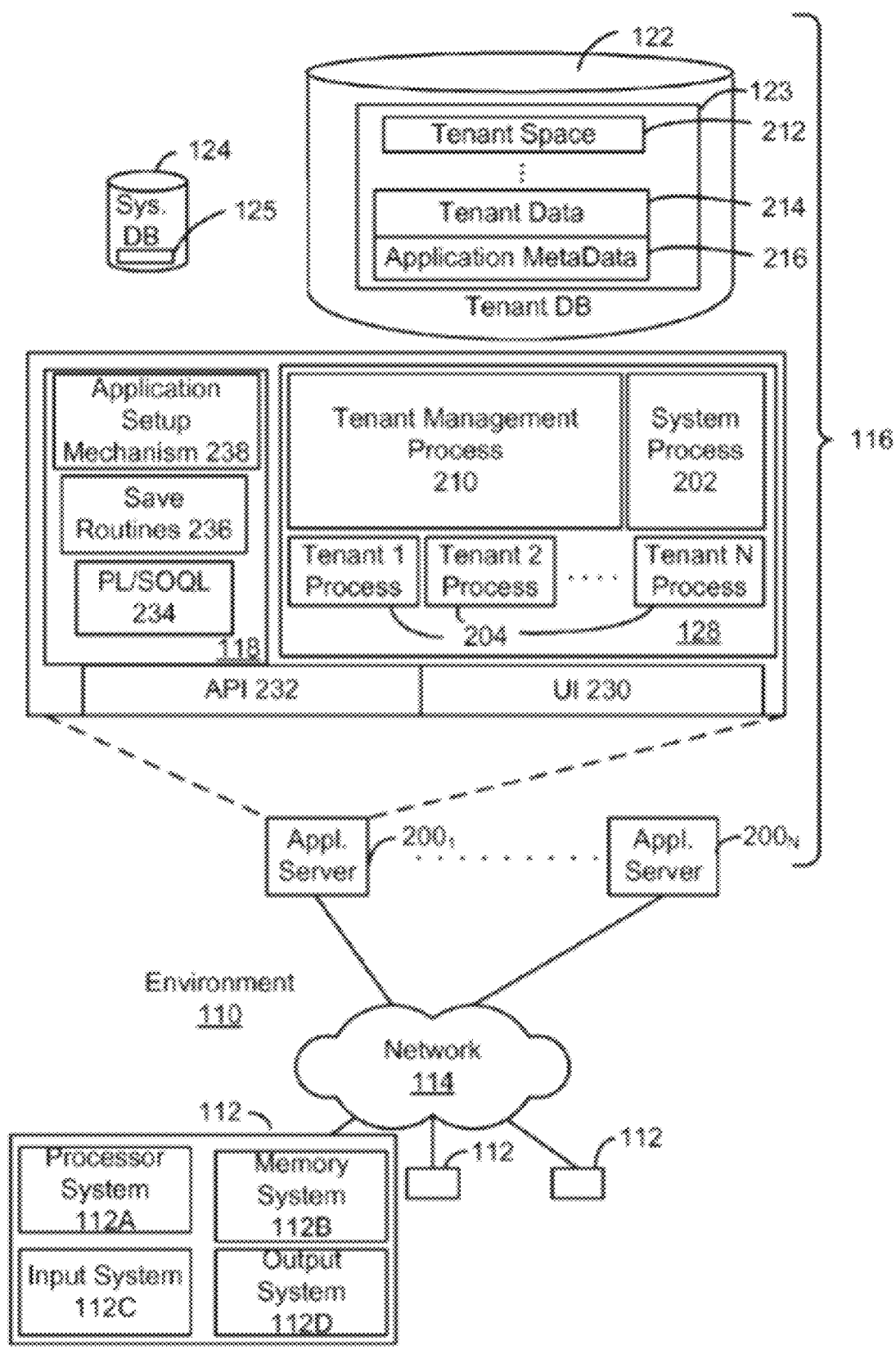
FIG. 2 illustrates a block diagram of another example environment according to some embodiments.

FIG. 2 also illustrates the environment 110, which may be used to implement embodiments described herein. FIG. 2 further illustrates elements of system 116 and various interconnections, according to some embodiments. FIG. 2 shows that each of the user systems 112 may include a processor system 112A, a memory system 112B, an input system 112C, and an output system 112D. FIG. 2 shows the network 114 and the system 116. FIG. 2 also shows that the system 116 may include the tenant data storage 122, the tenant data 123, the system data storage 124, the system data 125, a user interface (UI) 230, an application program interface (API) 232, a PL/Salesforce.com object query language (PL/SOQL) 234, save routines 236, an application setup mechanism 238, applications servers $200_1$-$200_N$, a system process space 202, tenant process spaces 204, a tenant management process space 210, a tenant storage area 212, a user storage 214, and application metadata 216. In other embodiments, environment 110 may not have the same elements as those listed above and/or may have other elements instead of, or in addition to, those listed above.

The user systems 112, the network 114, the system 116, the tenant data storage 122, and the system data storage 124 were discussed above in FIG. 1. Regarding the user systems 112, the processor system 112A may be any combination of one or more processors. The memory system 112B may be any combination of one or more memory devices, short-term, and/or long-term memory. The input system 112C may be any combination of input devices, such as one or more keyboards, mice, trackballs, scanners, cameras, and/or interfaces to networks. The output system 112D may be any combination of output devices, such as one or more monitors, printers, and/or interfaces to networks. As shown in FIG. 2, the system 116 may include the network interface 120 (of FIG. 1) implemented as a set of HTTP application servers 200, the application platform 118, the tenant data storage 122, and the system data storage 124. Also shown is system process space 202, including individual tenant process spaces 204 and the tenant management process space 210. Each application server 200 may be configured to access tenant data storage 122 and the tenant data 123 therein, and the system data storage 124 and the system data 125 therein to serve requests of the user systems 112. The tenant data 123 might be divided into individual tenant storage areas 212, which can be either a physical arrangement and/or a logical arrangement of data. Within each tenant storage area 212, the user storage 214 and the application metadata 216 might be similarly allocated for each user. For example, a copy of a user's most recently used (MRU) items might be stored to the user storage 214. Similarly, a copy of MRU items for an entire organization that is a tenant might be stored to the tenant storage area 212. The UI 230 provides a user interface and the API 232 provides an application programmer interface to the system 116 resident processes and to users and/or developers at the user systems 112. The tenant data and the system data may be stored in various databases, such as one or more Oracle™ databases.

The application platform 118 includes an application setup mechanism 238 that supports application developers' creation and management of applications, which may be saved as metadata into tenant data storage 122 by the save routines 236 for execution by subscribers as one or more tenant process spaces 204 managed by the tenant management process space 210, for example. Invocations to such applications may be coded using PL/SOQL 234 that provides a programming language style interface extension to the API 232. Some embodiments of PL/SOQL language are discussed in further detail in U.S. Pat. No. 7,730,478, filed Sep. 21, 2007, entitled, "Method and System For Allowing Access to Developed Applications Via a Multi-Tenant On-Demand Database Service," which is incorporated herein by reference. Invocations to applications may be detected by one or more system processes, which manage retrieving the application metadata 216 for the subscriber, making the invocation and executing the metadata as an application in a virtual machine.

Each application server 200 may be communicably coupled to database systems, e.g., having access to the system data 125 and the tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network connection used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, therefore, an interface system implementing a load balancing function (e.g., an F5 Big-IP load balancer) is communicably coupled between the application servers 200 and the user systems 112 to distribute requests to the application servers 200. In one embodiment, the load balancer uses a least connections algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, the system 116 is multi-tenant, wherein the system 116 handles storage of, and access to, different objects, data and applications across disparate users and organizations.

As an example of storage, one tenant might be a company that employs a sales force where each salesperson uses the system 116 to manage his or her sales process. Thus, a user might maintain contact data, leads data, customer follow-up data, performance data, goals and progress data, etc., all applicable to that user's personal sales process (e.g., in the tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 116 that are allocated at the tenant level while other data structures might be managed at the user level. Because a MTS might support multiple tenants including possible competitors, the MTS should have security protocols that keep data, applications, and application use separate. Also, because many tenants may opt for access to a MTS rather than maintain their own system, redundancy, up-time, and backup are additional functions that may be implemented in the MTS. In addition to user-specific data and tenant specific data, the system 116 might also maintain system level data usable by multiple tenants or other data. Such system level data might include industry reports, news, postings, and the like that are sharable among tenants.

In certain embodiments, the user systems 112 (which may be client systems) communicate with the application servers 200 to request and update system-level and tenant-level data from the system 116 that may require sending one or more queries to the tenant data storage 122 and/or the system data storage 124. The system 116 (e.g., an application server 200 in the system 116) automatically generates one or more structured query language (SQL) statements (e.g., one or more SQL queries) that are designed to access the desired information. The system data storage 124 may generate query plans to access the requested data from the database.

In a database system, such as system 116 shown and described with respect to FIGS. 1 and 2, data or information may be organized or arranged in categories or groupings. Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields.

In a customer relationship management (CRM) system, for example, these categories or groupings can include various standard case tables for a case submitted to the system and the responses to the case, including help requests, data processing requests, annotated data generation requests, and other customer requests. For example, a CRM database may include a table that describes a customer request and may include the customer data and resulting response. In a CRM database and system providing an object localization framework that utilizes a pipeline of algorithmic approaches, machine learning processes, and/or neural networks to locate and classify objects in images, the CRM database may include one or more tables representing unannotated image data and resulting annotated image data. The annotated image data may include customer results from the unannotated image data and may further be used to train a neural network provided by the CRM system. In some multi-tenant database systems, tables might be provided for use by all tenants or may be only viewable by some tenants and agents (e.g., users and administrators) of the system.

In some multi-tenant database systems, tenants may be allowed to create and store custom objects, or they may be allowed to customize standard entities or objects, for example by creating custom fields for standard objects, including custom index fields. Systems and methods for creating custom objects as well as customizing standard objects in a multi-tenant database system are described in further detail in U.S. Pat. No. 7,779,039, filed Apr. 2, 2004, entitled "Custom Entities and Fields in a Multi-Tenant Database System," which is incorporated herein by reference. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The multi-tenant database system 116 described above may be accessed and used by a number of customers, clients, or other persons (generally, "users") regarding object localization in image data. To facilitate interaction between the database system 116 and the user, a search bar, voice interface, data upload process, or similar user interface tool is provided. The interface tool allows a user to submit unannotated image data requiring object localization through the framework provided herein (e.g., object bounding box generation identifying an object, as well as object class labels for classification). The interface tool further allows a user to see the results of object localization, provide feedback on the resulting bounding box generation, request processing using different object localization processes discussed herein, and receive the resulting annotated data used for neural network training.

For neural networks providing object detection (e.g., detecting instances of semantic objects of a certain class in images or videos), large amounts of annotated data are required to receive good object detection results. For example, tens of thousands or more annotated images having bounding box information of an object and classification may be required to identify an object. Moreover, for detection of multiple different types of objects, class labels, and other semantic items in images, billions of different annotated images showing those different semantic items may be requires. Thus, a customer of the CRM system must provide large amounts of manpower to manually label images. This introduces human error into the process of annotating data. Furthermore, a database system may require large amounts of resources to store different sets of image data. It is a difficult task to train neural networks. In a multi-tenant system, such as Salesforce.com, a customer may be required to utilize a large amount of resources to train a neural network for object detection. Continuing with the example, because the customer may be interest in quickly training a neural network without using valuable manpower and database resources, it may be desirable or preferable that the unannotated image data is annotated using an automated framework that requires no or minimal user input to generate bounding box information and other annotations in unlabeled or unannotated image data. As such, according to some embodiments, systems and methods are provided for generating annotated data for object detection neural networks.

Neural Model

According to some embodiments, in a multi-tenant database system accessible by a plurality of separate and distinct organizations, such as system 116 shown and described with respect to FIGS. 1 and 2, a table structuralizing module is provided for transforming an unstructured data table to a one-dimensional relational table. The table structuralizing module may be installed or implemented at a computing device shown in FIG. 3.

Figure 3:
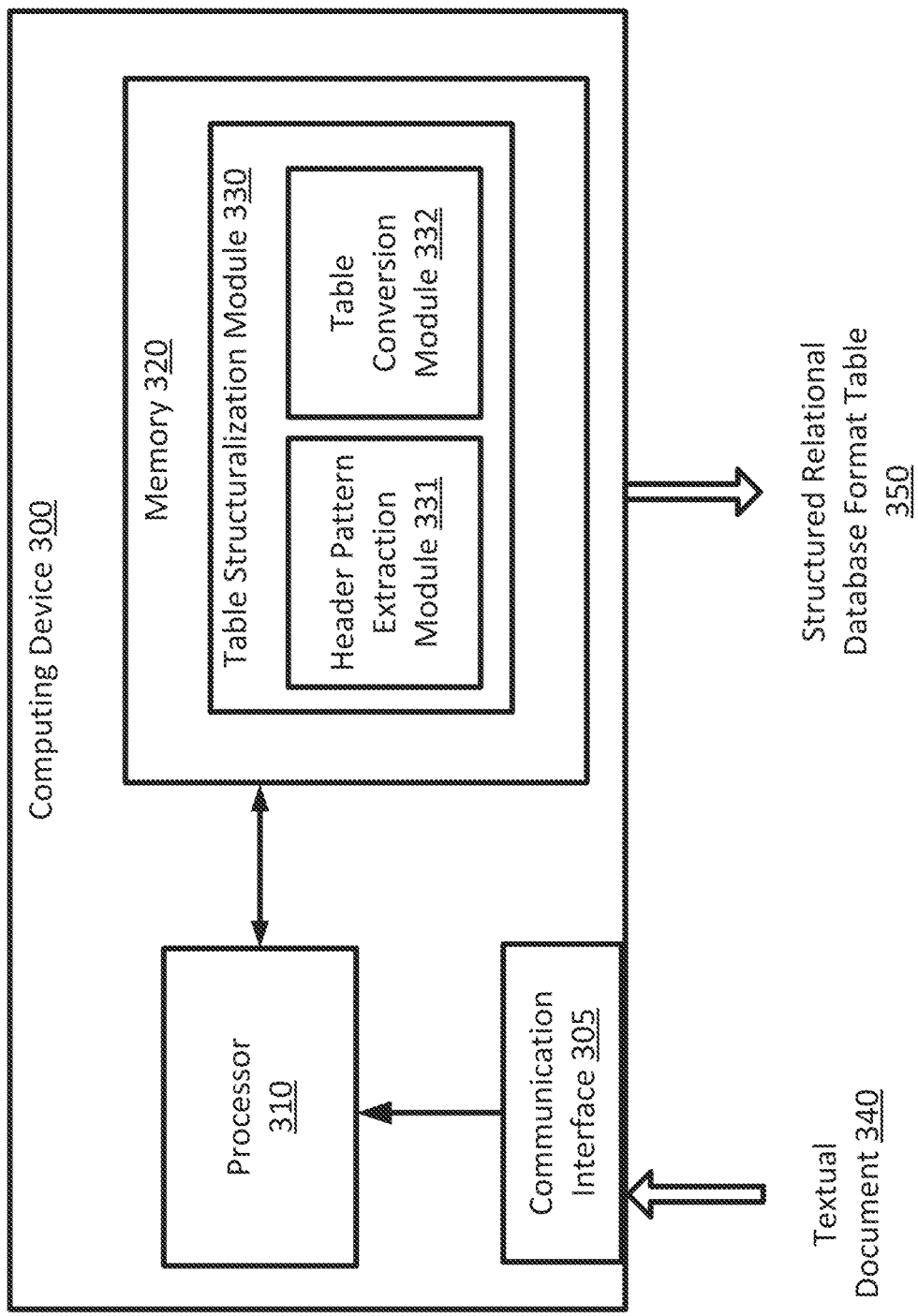
FIG. 3 is a simplified diagram of a computing device implementing table transformation, according to some embodiments.

FIG. 3 is a simplified diagram of a computing device 300 according to some embodiments. As shown in FIG. 3, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities. In some examples, memory 320 may include non-transitory, tangible, machine readable media that includes executable code that when run by one or more processors (e.g., processor 310) may cause the one or more processors to perform any of the methods described further herein.

As shown, memory 320 includes a table structuralizing module 330 for transforming an unstructured table from an input textual document 340 into a structured relational database format table 350 suitable for a relational database. For example, the input textual document 340 may be an editable document file, or an image file that includes one or more data tables. The table structuralizing module 330 further includes sub-modules such as the header pattern extraction module 331 and a table conversion module 332. Specifically, the header pattern extraction module 331 is configured to identify an unstructured table from the input textual document 340 and determine a header pattern associated with the table. The table conversion module 332 is configured to transform the unstructured table to a one-dimensional relational table based on the determined header pattern. Further details on operations of the header pattern extraction module 331 and the table conversion module 332 are further described in relation to FIGS. 4A-9.

After implementing and executing the table structuralizing module 330, in some embodiments, the output structured relational table 350 provided by table structuralizing module 330 is global for the multi-tenant database system, such as system 116, and applied to or used for all organizations or tenants whose users or customers utilize system 116 for data object generation, management, and use. Computing device 300 may receive or intake the input textual document 340 from a user of an organization or tenant accessing the database system. The input textual document 340 of unstructured data tables can be any type data in that it can take the form of an editable document file such as a PDF or a DOC file, an image file, and the like. In some embodiments, the input textual document 340 is not constrained, restricted, or required to be in a particular form. Computing device 300 can receive the textual document 340 through a user interface, a communication interface 305 via a communication network, and/or the like.

Figure 4A:
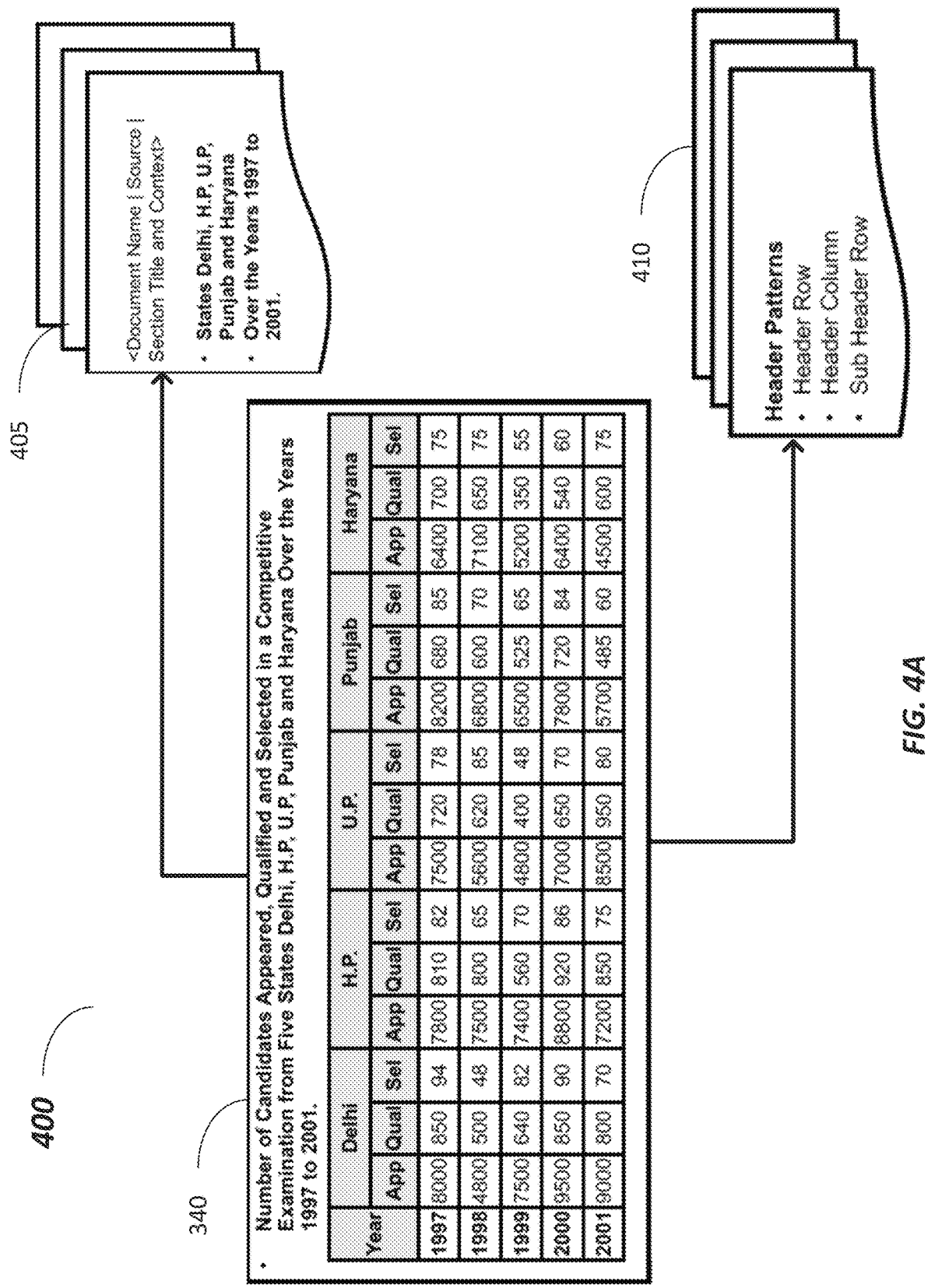
FIGS. 4A-4B is a simplified diagram illustrating an operation on an unstructured table to extract header information by the header extraction module shown in FIG. 3, according to embodiments described herein.
Figure 4B:
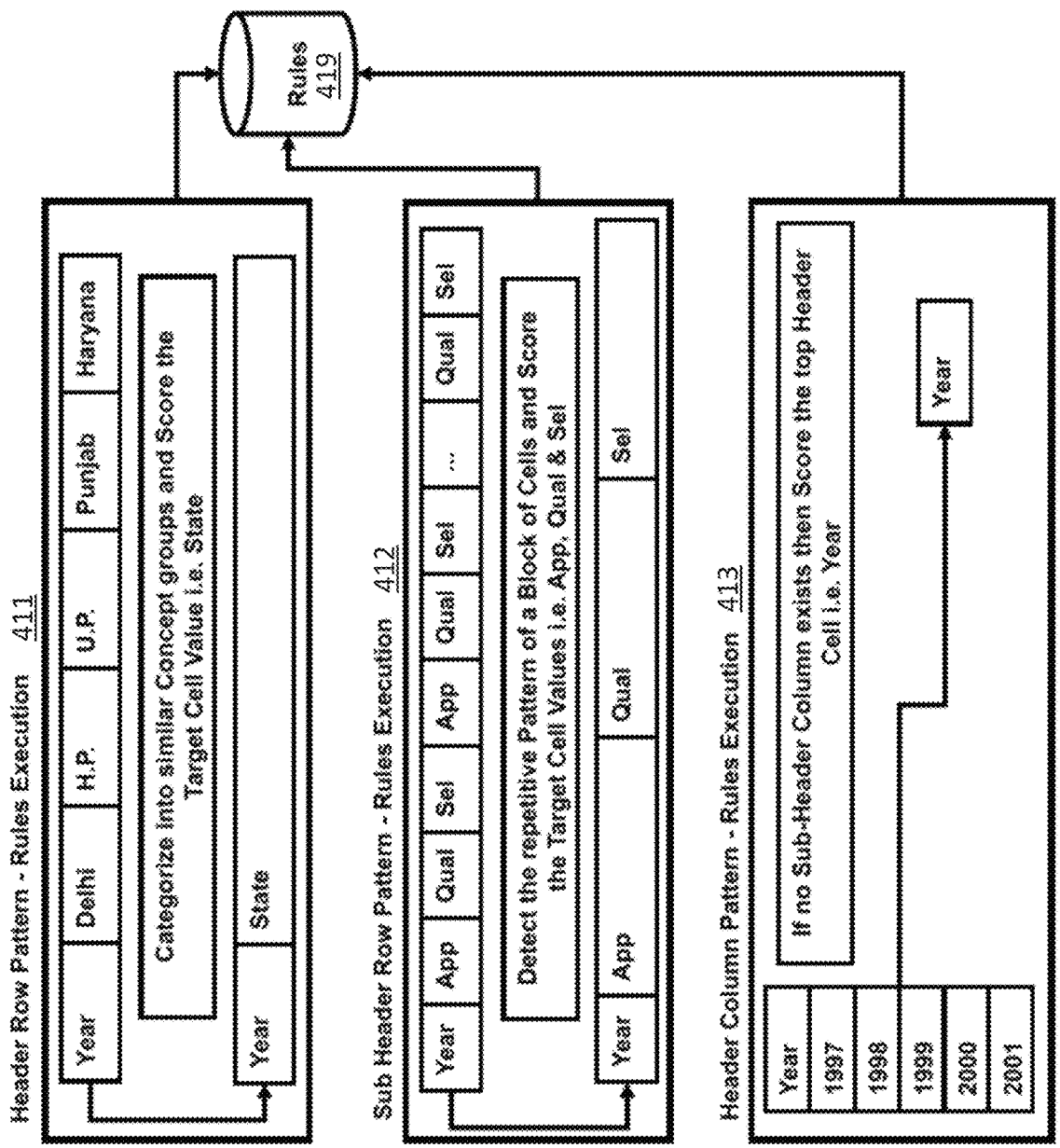

FIGS. 4A-4B is a simplified diagram 400 illustrating an operation on an unstructured table to extract header information by the header extraction module 331 show in FIG. 3, according to embodiments described herein. Diagram 400 shows an example textual document 340 which includes a paragraph of text, and a table. Pattern recognition may be applied on the textual document 340 to identify an unstructured table, e.g., with a number of rows and a number of columns. Specifically, the first two rows of the unstructured table may be identified as possible header rows, e.g., based on styling difference in fonts (bold characters in the header vs. regular characters in the body), cell format (shaded cell background in the header vs. unshaded cell background in the body), data type of cell values (phrases "Year," "Delhi," "App," "Qual," etc. in the header vs. numerical values "1997," "8000," "850," etc. in the body), and/or the like.

Upon identifying the first two rows of the unstructured table as possible header rows, a header pattern 410 may be extracted. For example, the header pattern 410 identifies the header row and the categories in the header row, e.g., "Year," "Delhi," "H.P." "U.P." etc. For each category in the header row, the header pattern 410 identifies the sub-categories that are divided from the category, e.g., under the category "Delhi," three subcategories "App," "Qual," "Sel" may be identified, etc. The header pattern 410 may further identify a header column, which is usually the left most column.

In some examples, metadata 405 associated with the unstructured table may be identified via the textual document 340. For example, metadata information associated with the textual document 340 such as the document title, document name, etc. may be obtained. For another example, text classification may be performed upon the text surrounding the unstructured table in the document 340, e.g., the paragraphs immediately before or after the unstructured table, etc. Key phrases may be extracted from the text to provide a context to the unstructured table. For instances, key phrases "Number of Candidates," "Appeared," "Qualified," "Selected," "five states," "Delhi," "H.P," "U.P," "Punjab" "Haryana," "years 1997 to 2001" etc. may be extracted as the context to the unstructured table.

In FIG. 4B, a set of rules may be generated for the header pattern and be stored at the rules database 419. For example, for the header row pattern 411, e.g., the first header row of cell values "Year," "Delhi," "H.P." "U.P" "Punjab," etc., classification of the cell values based on the metadata 405 may indicate that the cell values "Delhi," "H.P." "U.P" "Punjab," etc. correspond to "State." Thus, a first rule is executed for a header row pattern including multiple entries that belong to the same category, e.g., to categorize the multiple entries into the same concept group "State," and generate a new cell value "State" for the header row.

For the sub-header row pattern 411, e.g., the second header row of "App," "Qual," "Sel," "App," "Qual," "Sel," etc., multiple repetitive cell values may be detected. Thus, a second rule can be executed for the second header row to detect the repetitive cell values, and generate new cell values of only the unrepeated cell values, e.g., "App," "Qual," "Sel."

For the header column pattern 413, e.g., the left-most column of "Year," "1997," "1998," etc., as no sub-header column exists, a third rule is executed to summarize the header column as the category "Year."

In some examples, pre-defined header pattern rules may be obtained from a rules database 419 based on the header patterns, e.g., 411-413. In some examples, when no rule has been pre-stored corresponding to a specific header pattern, e.g., sub-header row pattern 412, the header extraction module 331 analyzes the cell values in the sub-header row and detects the repetitive pattern as described above and generate a new rule for this header pattern 412 for storing in the rules database 419.

Figure 5A:
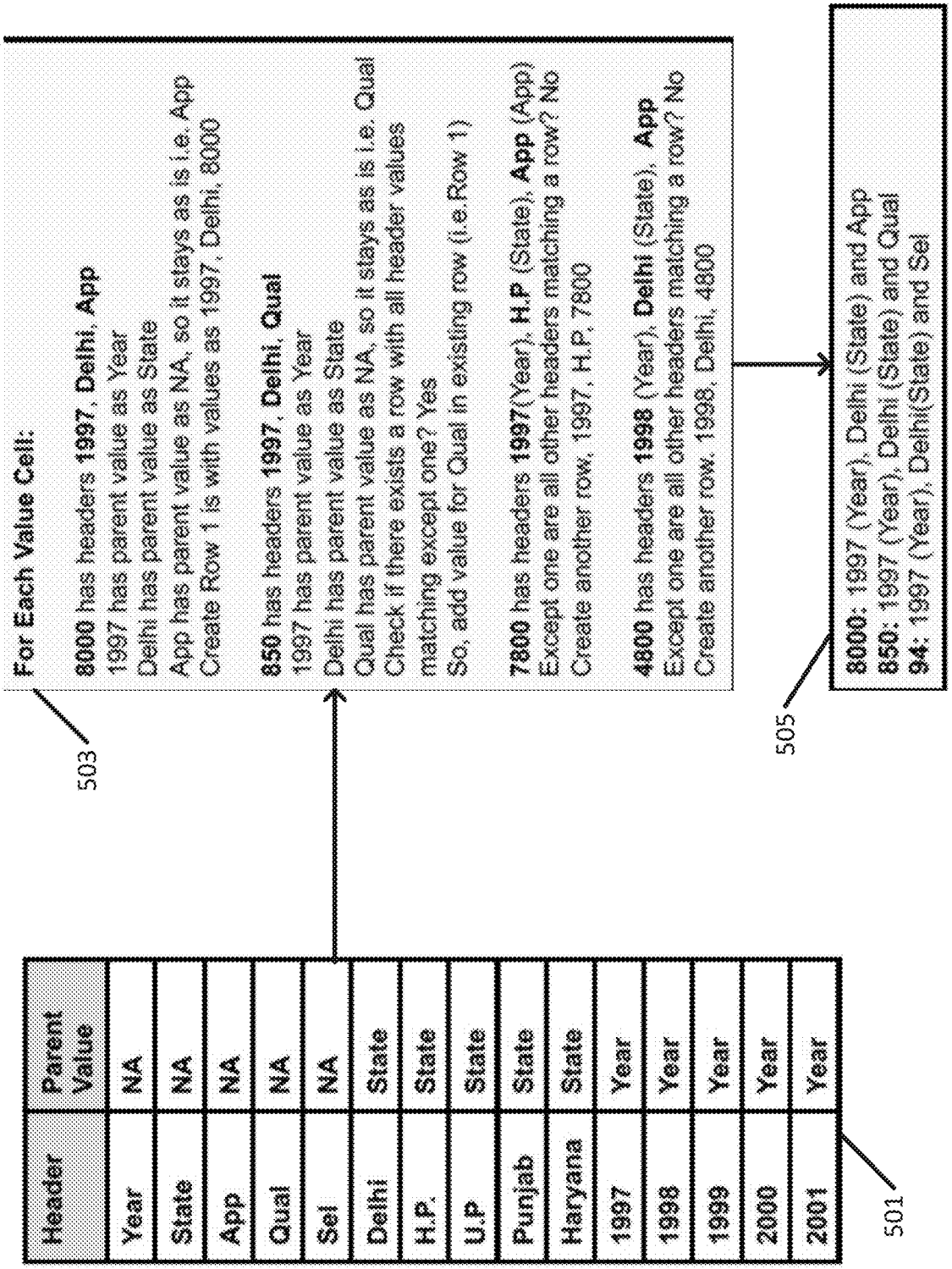

FIGS. 5A-5B is a simplified diagram 400 illustrating an operation on an unstructured table by the table conversion module 332 show in FIG. 3, according to embodiments described herein. In some examples, upon executing header pattern rules in FIG. 4B, each cell value in the header row, sub-header row(s) and header column may be assigned with a score indicating the parent cell value of the respective cell value. For example, as shown at table 501, each header cell value in the header row, the sub-header row and the header column is listed under "header," including the original cell value "Year," the generated new cell value "State" that the original cell values "Delhi," "H.P," "U.P," etc. belong to, original cell values "App," "Qual," "Sel," original cell values "Delhi," "H.P," "U.P," original cell values "1997," "1998," "1999," etc. For each cell value, a parent cell value is identified based on the corresponding header pattern and the rule execution shown in FIG. 4B. For example, for the header cell values "Year," "State," the header row pattern 411 and the corresponding rule shows that these cell values do not have a parent category that encompass the respective cell values, and hence the corresponding parent value is "NA." For cell values "App," "Qual," "Sel," the sub-header row pattern 412 and the corresponding rule shows that these cell values are obtained after repetitive value removal but do not have any parent category, and hence the corresponding parent value is "NA." For cell values "Delhi," "H.P," "U.P," the header row pattern 411 and the corresponding rule shows that these cell values belong to a category "State" which has been generated as a new cell value, and hence the corresponding parent value is "State." For cell values "1997," "1998," "1999," etc., the header column pattern 413 and the corresponding rule shows that these cell values belong to a category "Year" and hence the corresponding parent value is "Year."

The scoring table 501 is then used to establish a relationship between each non-header cell and the headers. For example, as shown at process 503, for a non-header cell having the value "8000," this non-header cell corresponds to original headers "1997," "Delhi," "App" from the original unstructured table. Then the parent value corresponding to each original header is found, e.g., "Year," "State," "NA," respectively. Therefore, new header values "Year" and "State" are added to the header row in a newly created one-dimensional table. As header cell value "App" does not have any parent, "App" stays as it is and is added to the new header row. For the non-header cell value "8000," a one-dimensional entry can be created as "Delhi" under column header "State," "1997" under column header "year," "8000" under column header "App."

Similarly, for a non-header cell having the value "850," this non-header cell corresponds to original headers "1997," "Delhi," "Qual" from the original unstructured table. Then the parent value corresponding to each original header is found, e.g., "Year," "State," "NA," respectively. Therefore, as header cell value "Qual" does not have any parent, "Qual" stays as it is and is added to the new header row. Specifically, as "Qual" is treated as a header cell value in the new one-dimensional table, before generating a new one-dimensional entry, the table conversion module 332 may search for the one-dimensional entries that have been added, to check if any existing one-dimensional entries share the same cell values with "1997," "Delhi" under added header columns "Year" and "State." If an existing one-dimensional entry is found, no new one-dimensional entry needs to be created. Instead, cell value "850" under the column header "Qual" is added to the existing one-dimensional entry.

Process 503 may iterate all non-header cells in the unstructured table and convert all non-header cell values to one-dimensional rows as shown at 505.

Thus, as shown FIG. 5B, a one-dimensional table 350 can be created from the original complex and unstructured table in the input 340. The one-dimensional table 350 includes only one header row having headers obtained based on header patterns 411-413 in FIG. 4B and the scoring table 501 in FIG. 5A. Each row under the header row is generated from each non-header cell value from the original unstructured table, as described at process 503 described in FIG. 5A. In this way, the one-dimensional table 350 has a relational format to be stored in a relational database.

Figure 6:
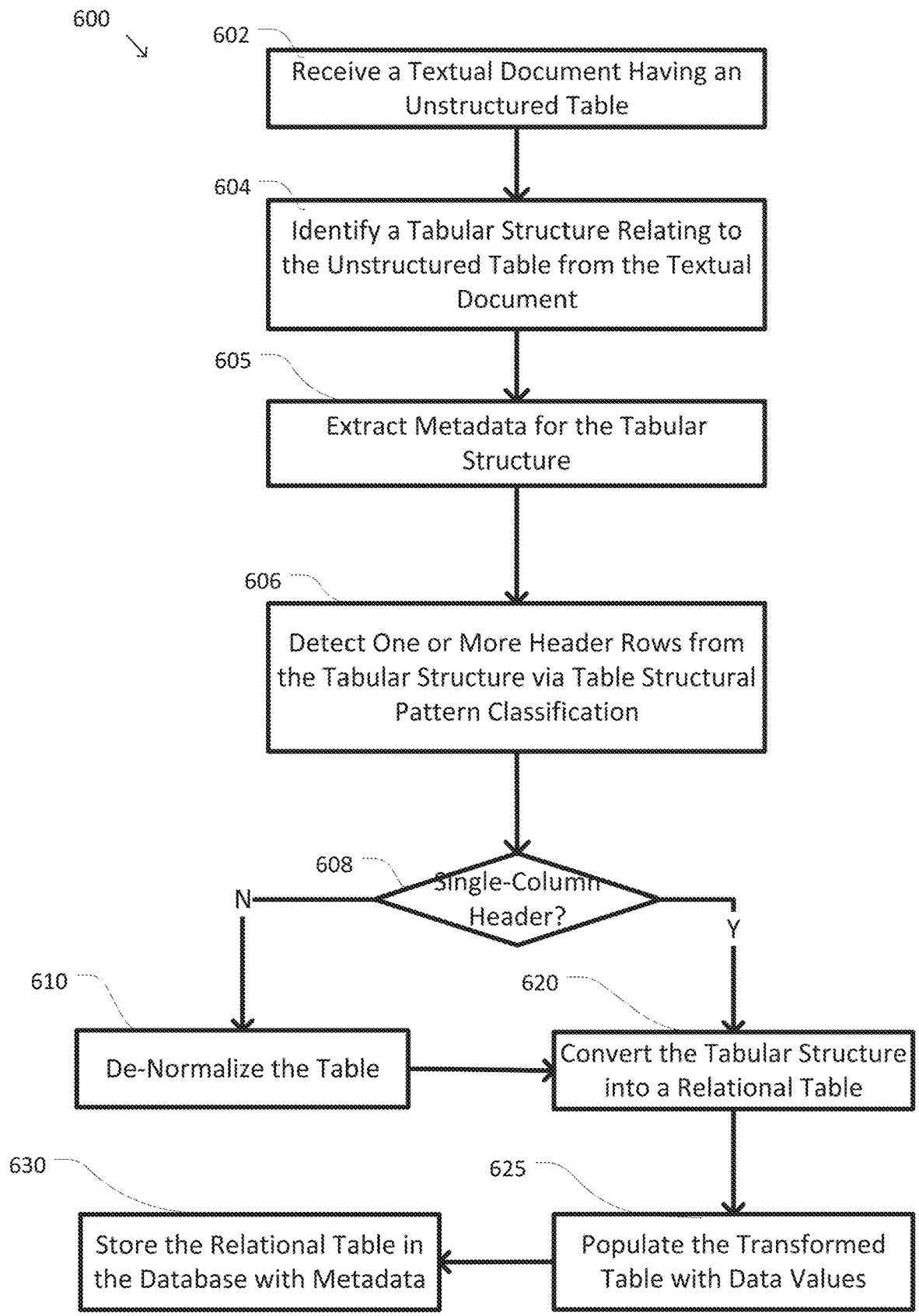
FIG. 6 is a simplified logic flow diagram illustrating a method of operating the table structuralizing module shown in FIG. 3 to transform an unstructured table to a relational table, according to some embodiments.

FIG. 6 is a simplified logic flow diagram illustrating a method 600 of operating the table structuralizing module 330 shown in FIG. 3 to transform an unstructured table to a relational table, according to some embodiments. The example method 600 including processes 602-630 in FIG. 6 may be implemented, at least in part, in the form of executable code stored on non-transitory, tangible, machine-readable media that when run by one or more processors may cause the one or more processors to perform one or more of the processes 602-630. In some embodiments, these processes may correspond to the method used by the table structuralizing module 330 to transform an unstructured table to a relational table.

Method 600 starts at process 602, at which a textual document having an unstructured table is received, e.g., the input document 340 may be received via a communication interface 305. At process 604, a tabular structure relating to the unstructured table is identified from the textual document. For example, pattern recognition may be applied on the example textual document 340 shown in FIG. 4A to identify a number of rows and cells forming a tabular structure.

At process 605, metadata may be extracted for the tabular structure. For example, as previously discussed in relation to FIG. 4A, metadata 405 such as the document name, title, textual context of the table, etc. may be obtained from the textual document.

At process 606, one or more header rows may be detected from the tabular structure via table structural pattern classification. For example, as previously discussed in relation to FIG. 4B, header row or column patterns 411-413 may be obtained.

At process 608, when each header cell corresponds to a single-column header, e.g., the respective header cell is not further divided by sub-header cells, the unstructured table may be ready to be converted as a relational table at process 620, e.g., by converting each row according to the header row.

Figure 8:
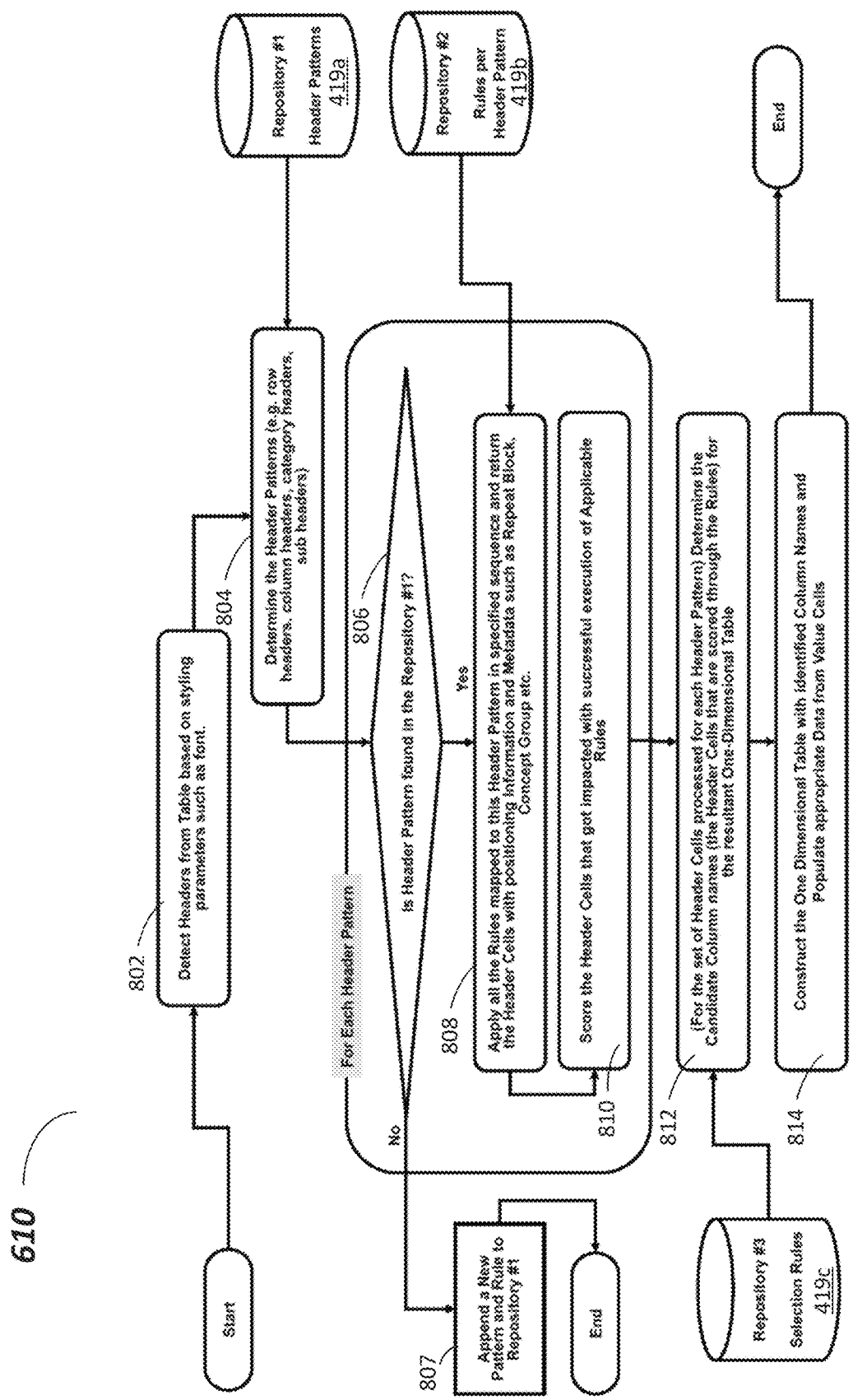
FIG. 8 is a simplified logic flow diagram illustrating process shown in FIG. 6 to de-normalize a complex table, according to some embodiments.

When at least one header cell is divided by sub-header cells, the table is de-normalized at process 610 into a one-dimensional table, as further described in relation to FIG. 8.

Method 600 then proceeds from process 620 to process 625, at which the transformed table is populated with data values from the unstructured table. At process 630, the transformed relational table is stored in a relational database with the metadata associated with the original unstructured table.

Figure 7:
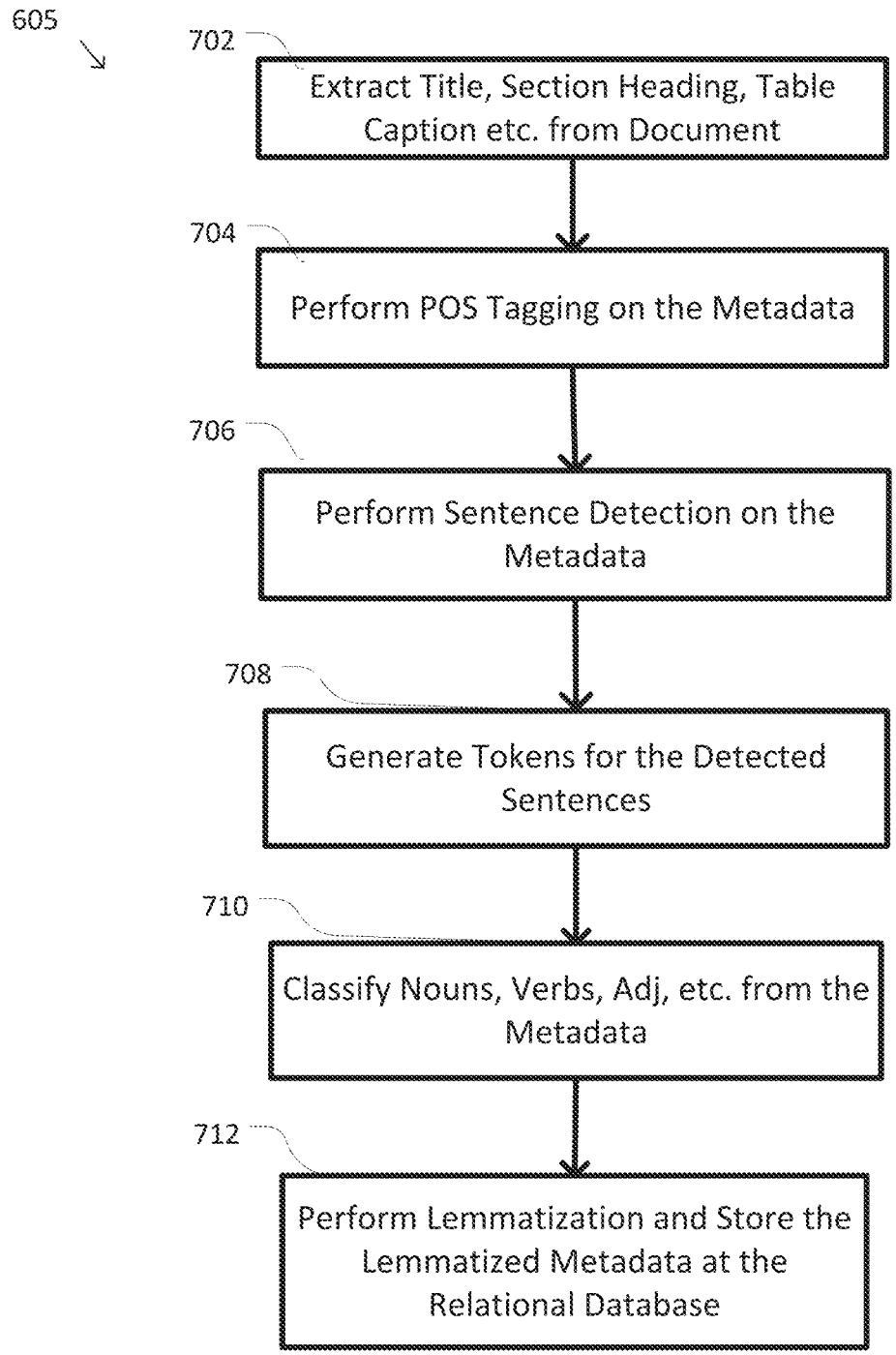
FIG. 7 is a simplified logic flow diagram illustrating process shown in FIG. 6 to extract metadata for the tabular structure, according to some embodiments.

FIG. 7 is a simplified logic flow diagram illustrating process 605 shown in FIG. 6 to extract metadata for the tabular structure, according to some embodiments. The example process 605 including sub-processes 702-712 in FIG. 7 may be implemented, at least in part, in the form of executable code stored on non-transitory, tangible, machine-readable media that when run by one or more processors may cause the one or more processors to perform one or more of the sub-processes 702-712. In some embodiments, these processes may correspond to the method used by the table structuralizing module 330 to extract metadata for the tabular structure.

At sub-process 702, metadata associated with the input textual document (e.g., 340 in FIG. 3) such as document name, title, section heading, table caption, etc. may be extracted. At sub-process 704, the table structuralizing module 330 may perform part-of-speech (POS) tagging on the metadata and/or the text in the textual document. For example, one or more words in the text surrounding the tabular structure may be classified, e.g., identifying the relationship with adjacent and related words in the phrase, sentence or the paragraph, to indicate the context of the table. At sub-process 706, sentence detection may be performed on the metadata or the text surrounding the tabular structure, and tokens of the detected sentences may be generated at sub-process 708 to further establish the context of the table. At sub-process 710, words from the sentence are classified into nouns, verbs, adjectives, etc., to further establish the context of the table. At sub-process 712, lemmatization may be performed on the identified nouns, verbs, adjustives, etc., by vocabulary and morphological analysis, and the lemmatization data is stored with the metadata at the relational database.

FIG. 8 is a simplified logic flow diagram illustrating process 610 shown in FIG. 6 to de-normalize a complex table, according to some embodiments. The example process 610 including sub-processes 802-814 in FIG. 8 may be implemented, at least in part, in the form of executable code stored on non-transitory, tangible, machine-readable media that when run by one or more processors may cause the one or more processors to perform one or more of the sub-processes 802-814. In some embodiments, these processes may correspond to the method used by the table structuralizing module 330 to de-normalize the complex table.

At sub-process 802, a number of headers may be detected from the unstructured table, e.g., based on styling parameters. For example, as discussed in relation to FIG. 4A, header cells may have bold fonts, with a different cell background color, and/or the like, as compared to non-header cells. At sub-process 804, the header patterns may be determined, e.g., the hear/sub-header row patterns 411-412, header column pattern 413 described in relation to FIG. 4B.

Then for each header pattern, a query is transmitted to the header pattern database 419a at sub-process 806 to determine whether the respective header pattern is previously stored. When no matching header pattern is found, process 610 proceeds to sub-process 807, the header pattern is added to the header pattern database 419a and a new rule to process the header cells is appended. If a matching header pattern is found at sub-process 806, the previously stored rule associated with the matching header pattern is retrieved from a rule database 419b at sub-process 808, and the one or more rules are applied to the header pattern. For example, as described in relation to FIG. 4B, a new concept group that the headers belong to (e.g., "State" for header pattern 411), repetitive headers removal (e.g., in header pattern 412) may be obtained at sub-process 808.

At sub-process 810, all header cells from the original unstructured table and newly generated header cells corresponding to the concept groups are assigned scores representing the parent values, e.g., as described in relation to scoring table 501 in FIG. 5A.

At sub-process 812, after all header patterns in the original unstructured table are processed, a number of header names are determined for the de-normalized one-dimensional table based on the rule execution on the header patterns. For example, as discussed in relation to process 503 in FIG. 5A, the header names may be progressively determined and added to the new header row in the de-normalized table by processing each non-header cell value in the original unstructured table and determining corresponding headers for the non-header value based on the scoring table 501. In some examples, header name selection rules may be obtained from the selection rule database 419c to determine the header names.

At sub-process 814, the one-dimensional table is generated using the determined header names, and populated with non-header values from the original unstructured table.

Figure 9:
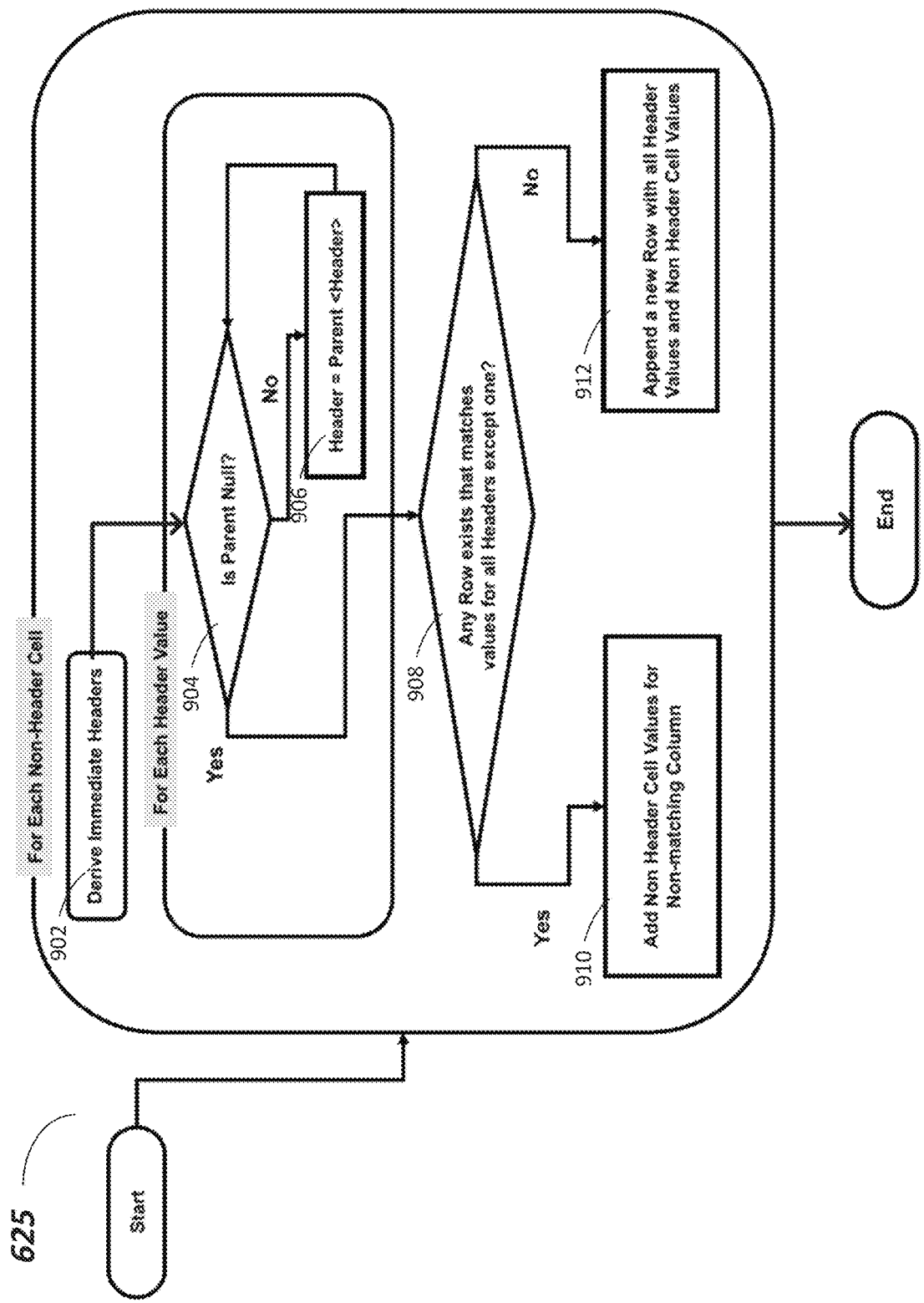
FIG. 9 is a simplified logic flow diagram illustrating process shown in FIG. 6 to populate cell values into the determined one-dimensional table, according to some embodiments.

FIG. 9 is a simplified logic flow diagram illustrating process 625 shown in FIG. 6 to populate cell values into the determined one-dimensional table, according to some embodiments. The example process 625 including sub-processes 902-912 in FIG. 9 may be implemented, at least in part, in the form of executable code stored on non-transitory, tangible, machine-readable media that when run by one or more processors may cause the one or more processors to perform one or more of the sub-processes 902-912. In some embodiments, these processes may correspond to the method used by the table structuralizing module 330 to populate cell values into the determined one-dimensional table.

At sub-process 902, for each non-header value in the original unstructured table, the immediate headers are determined. For example, as shown at process 503 in FIG. 5A, for non-header value "8000," the corresponding headers are "1997," "Delhi," and "App." Then for each header, the parent value is identified, e.g., from scoring table 501. At sub-process 904, when the parent value for the respective header is determined to be not null, e.g., parent value for header "1997" is "Year" from the scoring table 501, process 625 proceeds to sub-process 906, at which a new header corresponding to the parent value is generated for the one-dimensional table, and the original header is listed as a non-header value under the new header. For example, a new header "Year" is then added to the one-dimensional table, with an entry of "1997" added under the header "Year."

Alternatively, at sub-process 904, when the parent value for the respective header is determined to be null, e.g., parent value for header "App" is "NA" from the scoring table 501, process 625 proceeds to sub-process 908, which checks whether an existing row in the one-dimensional table has the same headers except the one header that does not have a parent value, e.g., with header "1997" and "Delhi" but not "App." For example, when another row containing "1997" and "Delhi" already exists, process 625 proceeds to sub-process 910, at which a new header of the non-matching header "App" is added to the header row in the one-dimensional table, and the non-header cell value "8000" is added to the row containing the matching entries "1997" and "Delhi" under the newly added header "App."

Alternatively, at sub-process 908, if no existing row in the one-dimensional table has the same headers except the one header that does not have a parent value, process 625 proceeds to sub-process 912, at which a new row is created based on the headers and the non-header cell value, and the header that has a null parent value is added to the header row. For example, a new row of "1997," "Delhi," and "8000" is created, and a new header "App" is added to the header row. Sub-processes 904-912 may repeat for each non-header cell value in the original unstructured table.

Some examples of computing devices, such as computing device 300, may include non-transitory, tangible, machine readable media that include executable code that when run by one or more processors (e.g., processor 310) may cause the one or more processors to perform the processes of method 800. Some common forms of machine readable media that may include the processes and sub-processes of method 800 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modifications, changes and substitutions are contemplated in the foregoing disclosure and in some instances, some features of the embodiments may be employed without a corresponding use of other features. One of ordinary skill in the art would recognize many variations, alternatives, and modifications. Thus, the scope of the present application should be limited only by the following claims, and it is appropriate that the claims be construed broadly and in a manner consistent with the scope of the embodiments disclosed herein.

What is claimed is:

1. A system for transforming an unstructured table from a textual document into a table suitable for a relational database, the system comprising:
   a communication interface that receives the textual document having the unstructured table;
   a memory containing machine readable medium storing machine executable code; and
   one or more processors coupled to the memory and configurable to execute the machine executable code to cause the one or more processors to:
      identify a tabular structure relating to the unstructured table from the textual document;
      detect one or more headers based on a characteristic associated with a text in the one or more headers from the tabular structure;
      create one or more new headers and corresponding new columns by expanding the one or more headers based on a header pattern of the detected one or more headers;
      generate a one-dimensional table structure according to a relational database format based on the one or more new headers; and
      populate the one-dimensional table structure with corresponding data values extracted from the unstructured table.

2. The system of claim 1, wherein the header pattern is determined based on a relationship between the detected one or more headers, and wherein the one or more headers from the tabular structure are detected by:
   determining whether a first row from the plurality of rows is a header row;
   determining, for each cell within the header row, whether the respective cell corresponds to multiple columns in an adjacent row; and
   in response to determining that a cell from the header row corresponds to multiple columns in an adjacent row, determining that the multiple columns in the adjacent row are sub-headers that divide the cell in the header row.

3. The system of claim 2, wherein one or more processors is configurable to execute the machine executable code to determine whether a first row from the plurality of rows is a header row by:
   determining the first row as the header row based on a difference between the first row and other rows in the tabular structure, wherein the difference includes any of a styling difference, or a data value format difference.

4. The system of claim 2, wherein the one or more processors is configurable to execute the machine executable code further to:
   in response to determining that no cell from the header row corresponds to multiple columns in the adjacent row:
   extract each cell label corresponding to a respective cell in the header row;
   extract cell values in rows below the header row; and
   store the extracted cell values corresponding to cell labels in a one-dimensional table format for storage in a relational database.

5. The system of claim 2, wherein the one or more processors is configurable to execute the machine executable code to determine a header pattern based on a relationship between the detected one or more headers by:
  determining a header pattern based on the sub-headers that divide the cell in the header row; and
  querying a header pattern database for the header pattern.

6. The system of claim 5, wherein the one or more processors is configurable to execute the machine executable code to determine one or more header names by applying a set of header pattern rules associated with the header pattern to the one or more headers by:
  when the header pattern is found in the header pattern database:
    retrieving a set of pre-defined rules associated with the header pattern, wherein the set of pre-defined rules provides hierarchical and positional information of header cells in the header pattern;
    obtaining a set of hierarchical definitions corresponding to a non-header cell by applying the set of pre-defined rules to the header pattern;
    scoring one or more header cells that belong to the set of hierarchical definitions upon application of the set of pre-defined rules; and
    determine one or more candidate column definitions based on the scored one or more header cells for the one-dimensional table.

7. The system of claim 6, wherein the one or more processors is configurable to execute the machine executable code to generate a one-dimensional table according to a relational database format using the one or more header names by:
  constructing the one-dimensional table using the one or more candidate column definitions as new header cells; and
  mapping cell values from the tabular structure to the one-dimensional table based on a comparison of the new header cells and the set of hierarchical definitions.

8. The system of claim 5, wherein the one or more processors is configurable to execute the machine executable code further to:
  when the header pattern is not found in the header pattern database:
    store the header pattern including the sub-headers that divide the cell in the header row in the header pattern database as a new header pattern; and
    analyze the sub-headers and the cell in the header row to append a new rule with the new header pattern.

9. The system of claim 1, wherein the one or more processors is configurable to execute the machine executable code to identify the tabular structure relating to the unstructured table from the textual document by:
  performing pattern recognition on the textual document;
  identifying, from the pattern recognition, the tabular structure containing a plurality of grids; and
  determining, from the plurality of grids, a plurality of rows and a plurality of columns associated with the tabular structure.

10. The system of claim 1, wherein the one or more processors is configurable to execute the machine executable code further to:
  extract metadata relating to the tabular structure from the document;
  perform part-of-speech tagging on the metadata; and
  store the tagged metadata with the one-dimensional table.

11. A method for transforming an unstructured table from a textual document into a table suitable for a relational database, the method comprising:
  receiving, via a communication interface, the textual document having the unstructured table;
  identifying a tabular structure relating to the unstructured table from the textual document;
  detecting one or more headers based on a characteristic associated with a text in the one or more headers from the tabular structure;
  creating one or more new headers and corresponding new columns by expanding the one or more headers based on a header pattern of the detected one or more headers;
  generating a one-dimensional table structure according to a relational database format based on the one or more new headers; and
  populating the one-dimensional table structure with corresponding data values extracted from the unstructured table.

12. The method of claim 11, wherein the header pattern is determined based on a relationship between the detected one or more headers, and wherein the one or more headers from the tabular structure are detected by:
  determining whether a first row from the plurality of rows is a header row;
  determining, for each cell within the header row, whether the respective cell corresponds to multiple columns in an adjacent row; and
  in response to determining that a cell from the header row corresponds to multiple columns in an adjacent row, determining that the multiple columns in the adjacent row are sub-headers that divide the cell in the header row.

13. The method of claim 12, wherein the determining whether a first row from the plurality of rows is a header row comprises:
  determining the first row as the header row based on a difference between the first row and other rows in the tabular structure, wherein the difference includes any of a styling difference, or a data value format difference.

14. The method of claim 12, further comprising:
  in response to determining that no cell from the header row corresponds to multiple columns in the adjacent row:
    extracting each cell label corresponding to a respective cell in the header row;
    extracting cell values in rows below the header row; and
    storing the extracted cell values corresponding to cell labels in a one-dimensional table format for storage in a relational database.

15. The method of claim 11, wherein the identifying the tabular structure relating to the unstructured table from the textual document comprises:
  performing pattern recognition on the textual document;
  identifying, from the pattern recognition, the tabular structure containing a plurality of grids; and
  determining, from the plurality of grids, a plurality of rows and a plurality of columns associated with the tabular structure.

16. The method of claim 15, further comprising:
  determining the header pattern based on the relationship between the detected one or more headers by:
    determining a header pattern based on the sub-headers that divide the cell in the header row; and
    querying a header pattern database for the header pattern.

17. The method of claim 16, wherein the determining one or more header names by applying the set of header pattern rules associated with the header pattern to the one or more headers comprises:

when the header pattern is found in the header pattern database:
retrieving a set of pre-defined rules associated with the header pattern, wherein the set of pre-defined rules provides hierarchical and positional information of header cells in the header pattern;
obtaining a set of hierarchical definitions corresponding to a non-header cell by applying the set of pre-defined rules to the header pattern;
scoring one or more header cells that belong to the set of hierarchical definitions upon application of the set of pre-defined rules; and
determine one or more candidate column definitions based on the scored one or more header cells for the one-dimensional table.

18. The method of claim 17, wherein the generating a one-dimensional table according to a relational database format using the one or more header names comprises:
constructing the one-dimensional table using the one or more candidate column definitions as new header cells; and
mapping cell values from the tabular structure to the one-dimensional table based on a comparison of the new header cells and the set of hierarchical definitions.

19. The method of claim 16, further comprising:
when the header pattern is not found in the header pattern database:
storing the header pattern including the sub-headers that divide the cell in the header row in the header pattern database as a new header pattern; and
analyzing the sub-headers and the cell in the header row to append a new rule with the new header pattern.

20. The method of claim 11, further comprising:
extracting metadata relating to the tabular structure from the document;
performing part-of-speech tagging on the metadata; and
storing the tagged metadata with the one-dimensional table.

\* \* \* \* \*